(12) United States Patent
Murase et al.

(10) Patent No.: US 11,130,322 B2
(45) Date of Patent: Sep. 28, 2021

(54) GAS BARRIER LAMINATE AND METHOD OF PRODUCING THE SAME

(71) Applicant: TOPPAN PRINTING CO., LTD., Tokyo (JP)

(72) Inventors: Tomokazu Murase, Tokyo (JP); Hiroshi Miyazaki, Tokyo (JP); Ryukichi Matsuo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 177 days.

(21) Appl. No.: 16/427,615

(22) Filed: May 31, 2019

(65) Prior Publication Data

US 2019/0283382 A1 Sep. 19, 2019

Related U.S. Application Data

(63) Continuation of application No. PCT/JP2017/042869, filed on Nov. 29, 2017.

(30) Foreign Application Priority Data

Dec. 1, 2016 (JP) ............................... JP2016-234417

(51) Int. Cl.
*B32B 27/34* (2006.01)
*B32B 27/36* (2006.01)
(Continued)

(52) U.S. Cl.
CPC ............... *B32B 27/34* (2013.01); *B05D 5/00* (2013.01); *B05D 7/04* (2013.01); *B05D 7/24* (2013.01);
(Continued)

(58) Field of Classification Search
CPC ........... B32B 1/02; B32B 17/00; B32B 17/02; B32B 17/04; B32B 17/06; B32B 23/00;
(Continued)

(56) References Cited

U.S. PATENT DOCUMENTS 8,921,688 B2 * 12/2014 Yamasaki ........... H01L 31/1884
136/256
2007/0111005 A1 5/2007 Oshita et al.
(Continued)

FOREIGN PATENT DOCUMENTS

CN 101184672 A 5/2008
JP H05-41508 B2 6/1993
(Continued)

OTHER PUBLICATIONS

International Searching Authority, "International Search Report," issued in connection with International Patent Application No. PCT/JP2017/042869, dated Feb. 27, 2018.
(Continued)

*Primary Examiner* — Walter Aughenbaugh
(74) *Attorney, Agent, or Firm* — Foley & Lardner LLP

(57) ABSTRACT

A method of producing a gas barrier laminate of the present disclosure includes a step of forming a coating film on a surface of a base film or a laminate including the base film, the coating film containing zinc ions, at least one of metal alkoxide and a hydrolysate thereof, and an aqueous polymer, and a step of drying the coating film to form a gas barrier layer on the surface of the base film or the laminate including the base film. A gas barrier laminate of the present disclosure includes a base film or a laminate including the base film, and a gas barrier layer provided on a surface of the base film or the laminate including the base film. In the gas barrier laminate, the gas barrier layer contains zinc dispersed in the gas barrier layer and an organic-inorganic composite.

20 Claims, 2 Drawing Sheets

(51) Int. Cl.
| | |
|---|---|
| *B05D 7/04* | (2006.01) |
| *B05D 7/24* | (2006.01) |
| *B32B 7/02* | (2019.01) |
| *B32B 7/12* | (2006.01) |
| *B32B 27/30* | (2006.01) |
| *B32B 27/00* | (2006.01) |
| *B32B 27/32* | (2006.01) |
| *B05D 5/00* | (2006.01) |
| *B32B 27/08* | (2006.01) |
| *C08J 7/043* | (2020.01) |
| *C08J 7/048* | (2020.01) |

(52) U.S. Cl.
CPC ............... *B32B 7/02* (2013.01); *B32B 7/12* (2013.01); *B32B 27/00* (2013.01); *B32B 27/08* (2013.01); *B32B 27/30* (2013.01); *B32B 27/306* (2013.01); *B32B 27/32* (2013.01); *B32B 27/36* (2013.01); *C08J 7/043* (2020.01); *C08J 7/048* (2020.01); *B05D 2201/04* (2013.01); *B05D 2301/00* (2013.01); *B32B 2250/02* (2013.01); *B32B 2250/04* (2013.01); *B32B 2307/7248* (2013.01); *B32B 2311/20* (2013.01); *B32B 2439/70* (2013.01)

(58) Field of Classification Search
CPC ......... B32B 23/04; B32B 23/08; B32B 23/14; B32B 23/16; B32B 27/34; B32B 27/36; B05D 7/04; B05D 7/24
See application file for complete search history.

(56) References Cited

U.S. PATENT DOCUMENTS

| | | |
|---|---|---|
| 2009/0297741 A1 | 12/2009 | Oshita et al. |
| 2011/0033716 A1 | 2/2011 | Nishiura et al. |
| 2011/0217561 A1 | 9/2011 | Fujimura et al. |

FOREIGN PATENT DOCUMENTS

| | | |
|---|---|---|
| JP | 2006-219518 A | 8/2006 |
| JP | 2008-254765 A | 10/2008 |
| JP | 2009-013383 A | 1/2009 |
| JP | 2009-155563 A | 7/2009 |
| JP | 2014-061682 A | 4/2014 |

OTHER PUBLICATIONS

International Searching Authority, "Written Opinion," issued in connection with International Patent Application No. PCT/JP2017/042869, dated Feb. 27, 2018.
Database WPI; Week 201431; Thompson Scientific, London, GB; AN 2014-G01297 XP002795692 dated 2017.
Extended European Search Report dated Nov. 29, 2019 for corresponding Application No. 17877104.4.

* cited by examiner

GAS BARRIER LAMINATE AND METHOD OF PRODUCING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/042869, filed on Nov. 29, 2017, which is based upon and claims the benefit of priority to Japanese Patent Application No. 2016-234417, filed on Dec. 1, 2016; the disclosures of which are incorporated herein by reference in their entireties.

TECHNICAL FIELD

The present disclosure relates to a gas barrier laminate and a method of producing the same.

BACKGROUND ART

Materials used for packaging food products are required to prevent degradation of the products inside the packages. Heat sterilization, such as retorting or boiling, is a method suitable for ensuring long shelf life of food. Amino acids forming proteins include sulfur-containing amino acids (methionine, cystine, cysteine, etc.) Meat products or egg products having a higher content of sulfur-containing amino acids emit retort odor after heat sterilization mentioned above. Retort odor is derived from sulfur compounds (hydrogen sulfide, methyl mercaptan, etc.) that are produced by hydrolyzation of sulfur-containing amino acids during heat treatment. It should be noted that retort odor in general refers to an odor unique to retort food (food distributed at normal temperature after pressure or heat sterilization at 100° C. or more). Retort odor referred to herein also includes similar odor emitted from food that has been boiled.

PTL 1 discloses a laminated pouch for packaging retort food. This laminated pouch includes an inner layer that is a polyolefin film contacting the food therein. The polyolefin film is permitted to contain a zinc oxide powder in a state of being dispersed therein.

CITATION LIST

Patent Literature

[PTL 1]
JP H05-41508 B2.

SUMMARY OF THE INVENTION

Technical Problem

However, the method of using a zinc oxide powder based on the conventional art has not been necessarily adequate for reducing retort odor. According to the research made by the inventors, the inner layer containing a zinc oxide powder is sensitive to acids. For example, if the food to be packaged contains vinegar, the zinc oxide may react with the vinegar and dissolve forming zinc acetate, which may disadvantageously lead to separation of the inner layer.

The present disclosure aims to provide a gas barrier laminate which is capable of adequately highly reducing retort odor and adequately minimizing separation of a layer even when in contact with food or the like containing acids, and a method of producing the gas barrier laminate.

Solution to Problem

A method of producing a gas barrier laminate according to the present disclosure includes the following steps:

A step of forming a coating film on a surface of a base film or a laminate including the base film, the coating film containing zinc ions, at least one of metal alkoxide and a hydrolysate thereof, and an aqueous polymer.

A step of drying the coating film to form a gas barrier layer on the surface of the base film or the laminate including the base film.

A coating liquid used for the above production method contains zinc dispersed in the form of ions. Thus, by forming a coating film on a surface of a base film or a laminate including the base film and by dry heating the coating film, zinc is more uniformly dispersed in the gas barrier layer compared to the case of using a zinc oxide powder. The sufficiently uniform dispersion of zinc in a gas barrier layer can achieve both high-level retort odor reduction and high-level acid resistance, and facilitate formation of a transparent gas barrier layer.

The coating liquid of the present disclosure contains zinc chloride, for example, as a source of zinc ions. Specifically, the coating liquid for forming a gas barrier layer can be prepared by adding zinc chloride to a solvent (e.g., water and/or alcohol), together with other components (metal alkoxide and/or a hydrolysate thereof, and an aqueous polymer). The present disclosure can also provide an advantage of controlling zinc content of the gas barrier layer by controlling the amount of the source of zinc ions used when preparing the coating liquid. From the perspective of stably and adequately achieving the advantageous effects of the present disclosure, zinc content of the gas barrier layer is preferably in the range of 1 mass % to 10 mass % relative to the mass of the gas barrier layer.

In the above production method, an organic-inorganic composite is formed by other components mentioned above contained in the coating liquid. Specifically, the metal alkoxide and/or its hydrolysate, and the aqueous polymer contained in the coating liquid become an organic-inorganic composite by hydrolyzation and dehydration condensation (e.g., sol-gel method). The inventors consider that the advantageous effects of the present disclosure are achieved because zinc contained in the form of ions in the coating liquid is fixed inside the gas barrier layer being sufficiently uniformly dispersed therein, or more specifically, because zinc is fixed to the organic-inorganic composite contained in the gas barrier layer.

The present disclosure provides a gas barrier laminate. Specifically, a gas barrier laminate according to an aspect of the present disclosure includes a base film or a laminate including the base film, and a gas barrier layer provided on a surface of the base film or the laminate including the base film. In the gas barrier laminate, the gas barrier layer contains zinc dispersed in the gas barrier layer and an organic-inorganic composite. A gas barrier laminate according to another aspect of the present disclosure includes a base film or a laminate including the base film, and a gas barrier layer provided on a surface of the base film or the laminate including the base film. In the gas barrier laminate, the gas barrier layer is provided by drying a coating film formed on the surface, and the coating film contains zinc ions, at least one of metal alkoxide and a hydrolysate thereof, and an aqueous polymer.

The above gas barrier laminate, in which zinc is sufficiently uniformly dispersed in the gas barrier layer, can achieve both high-level retort odor reduction and high-level acid resistance. In addition, since the gas barrier layer has adequately enhanced transparency, transparency of the gas barrier laminate as a whole can also be adequately enhanced.

Advantageous Effects of the Invention

The present disclosure provides a gas barrier laminate which is capable of adequately highly reducing retort odor and adequately minimizing separation of a layer even when in contact with food or the like containing acids, and a method of producing the gas barrier laminate.

DESCRIPTION OF REPRESENTATIVE EMBODIMENTS

Figure 1:
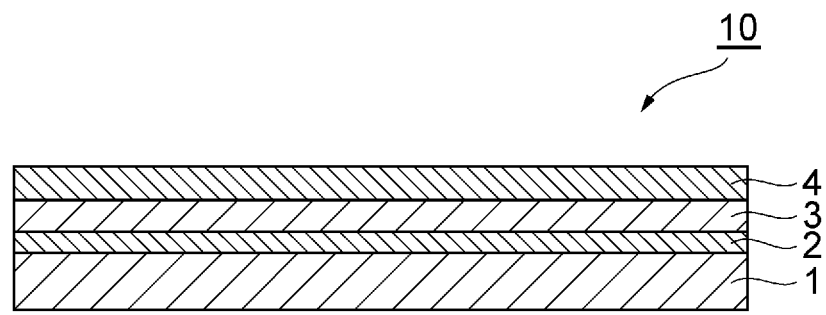
FIG. 1 is a cross-sectional view schematically illustrating an embodiment of a gas barrier laminate, according to the present disclosure.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

FIG. 1 shows a gas barrier laminate 10 according to the present embodiment. The gas barrier laminate 10 is characterized by sequential lamination of an adhesive layer 2, an inorganic deposited layer 3, and a gas barrier layer 4 on a base film 1.

The base film 1 is not particularly limited, and thus any known film may be used as long as the film is transparent and can maintain shape at a heating temperature of 200° C. or more. Examples of the base film 1 include polyester films (polyethylene terephthalate, polyethylene naphthalate, etc.), polyamide films (nylon 6, nylon 66, etc.), polystyrene films, polyvinyl chloride films, polyimide films, polycarbonate films, polyethersulfone films, acrylic films, and cellulose films (triacetylcellulose or diacetyl cellulose, etc.). Although not particularly limited, films having low thermal shrinkage are preferred.

Practically, it is preferred that the base film 1 is appropriately selected according to usage or required physical properties. Films of polyethylene terephthalate, polyamide, or the like may be used for pharmaceutical products, chemical products, food products, or the like. The base film 1 may have a thickness that is not particularly limited. A base film 1 with a thickness of about 6 μm to 200 μm may be used according to usage.

The base film 1 may have a surface to be laminated that has undergone various pretreatments, such as corona treatment, plasma treatment, flame treatment and the like, to an extent not impairing barrier properties, or may be provided with a coating layer, such as an adhesion-enhancing layer.

The adhesive layer 2 is provided on the base film 1 for the purpose of achieving two effects. One is to improve adhesion between the base film 1 and the inorganic deposited layer 3. The other is to smooth the surface to uniformly provide the inorganic deposited film 3 without any defects in the next processing, and compensate for fine barrier defects of the deposited film to exert high barrier performance. The adhesive layer 2 does not have to be provided if more adequate adhesion is achieved such as by allowing the surface of the base film 1 which is to be laminated to undergo the various pretreatments mentioned above.

The material for forming the adhesive layer 2 exerting the effects mentioned above may preferably be a nonaqueous resin. Examples of such a resin include silane coupling agents or organic titanate, polyacrylic resins, polyester, polyurethane, polycarbonate, polyurea, polyamide, polyolefin emulsions, polyimide, melamine, and phenol. From the perspective of hot water resistance, the material for the adhesive layer 2 may preferably contain an organic polymer having one or more urethane bonds or urea bonds.

For a urethane bond or a urea bond, a polymer introduced in advance during polymerization may be used. An organic polymer with a urethane bond may be formed by reaction of a polyol, such as an acrylic or methacrylic polyol, with an isocyanate compound having an isocyanate group, or by reaction of an amine resin having an amino group with an epoxy compound or the like having an epoxy group and a glycidyl group. An organic polymer with a urea bond may be formed by reaction of an isocyanate compound with water or a solvent, such as ethyl acetate, or an amine resin having an amino group. Of these materials, a composite of an acrylic polyol or a polyester polyol with an isocyanate compound, a silane coupling agent or the like is more preferred as a nonaqueous resin forming the adhesive layer 2.

The acrylic polyol refers to one having a terminal hydroxy group, among high-molecular-weight compounds obtained by polymerizing acrylic acid derivative monomers, and high-molecular-weight compounds obtained by copolymerizing acrylic acid derivative monomers with other monomers. The acrylic polyol is reacted with an isocyanate group of an isocyanate compound added later. The polyester polyol refers to one having two or more terminal hydroxyl groups, among acid materials and polyester resins. The acid materials include terephthalic acid, isophthalic acid, phthalic acid, methylphthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, and reactive derivatives thereof. The polyester resins are obtained from alcohols by using a known production method, and the alcohols include ethylene glycol, propylene glycol, 1,3-butanediol, 1,4-hexanediol, diethylene glycol, dipropylene glycol, 1,4-cyclohexane dimethanol, neopentylglycol, bishydroxyethyl terephthalate, trimethylolethane, trimethylolpropane, glycerin, and pentaerythritol. The polyester polyol is reacted with an isocyanate group of an isocyanate compound added later.

The isocyanate compound is added to enhance adhesion with a base or an inorganic oxide by a urethane bond that is formed by reaction with an acrylic polyol or a polyester polyol. The isocyanate compound mainly acts as a cross-linking agent or a curing agent. To achieve this, the isocyanate compound to be used may be a monomer such as aromatic tolylene diisocyanate (TDI) or diphenylmethane diisocyanate (MDI) and aliphatic xylene diisocyanate (XDI) or hexamethylene diisocyanate (HMDI), a polymer thereof, and a derivative thereof. These compounds may be used singly or by mixing two or more.

The silane coupling agent may be one including any organic functional group. Examples of the silane coupling agent include ethyl trimethoxysilane, vinyl trimethoxysilane, γ-chloropropyl methyldimethoxysilane, γ-chloropropyl trimethoxysilane, glycidoxypropyl trimethoxysilane, γ-methacryloxypropyl trimethoxysilane, and γ-methacryloxypropyl methyldimethoxysilane, and hydrolysates thereof. These materials may be used singly or in combination of two or more.

The adhesive layer 2 is formed through a process of applying a coating liquid onto a surface of the base film 1. A known commonly used method may be used for applying a coating liquid. The method may be casting, dipping, roll coating, gravure coating, screen printing, reverse coating, spray coating, kit coating, die coating, metering bar coating, combined chamber and doctor coating, curtain coating or the like. The coating film formed by applying a coating liquid is dry heated to form an adhesive layer 2. The adhesive layer 2 has a thickness, for example, of about 0.01 μm to 2 μm.

As the inorganic deposited layer 3, a material having high oxygen gas barrier properties may be used, including an aluminum oxide (AlOx), silicon oxide (SiOx), magnesium fluoride, ($MgF_2$), magnesium oxide (MgO), indium tin oxide (ITO), or the like. From the perspective of cost, barrier performance and transparency, aluminum oxide or silicon oxide, i.e. an inorganic oxide, is preferred.

The thickness of the inorganic deposited layer 3 may be appropriately determined according to usage, but may preferably be in the range of 10 nm to 300 nm, and more preferably 20 nm to 200 nm. The inorganic deposited layer 3, when having a thickness of 10 nm or more, may be made adequately continuous with ease. When the thickness is 300 nm or less, the occurrence of curling or cracking can be adequately minimized, and thus adequate barrier performance and flexibility can be easily achieved.

The inorganic deposited layer 3 can be formed by vacuum deposition. This method is preferred from the perspective of gas barrier performance or uniformity of the film. The method of forming a film may be a known method, such as vacuum vapor deposition, sputtering, or chemical vapor deposition (CVD). Due to high film forming speed and productivity, vacuum vapor deposition is preferred. Of vacuum vapor deposition methods, deposition using electron beam heating, in particular, is effective because film forming speed can be easily controlled by the radiation area, the electron beam current, or the like, or because the temperature of the deposition material can be increased or decreased in a short time.

The gas barrier layer 4 contributes not only to protecting the inorganic deposited layer 3, but also to improving vapor barrier properties of the laminate, and thus exerts high gas barrier properties working synergistically with the inorganic deposited layer 3. In addition to this, the gas barrier layer 4 contains an adequately uniform dispersion of zinc and thus exerts the effect of reducing retort odor. Zinc reacts with hydrogen sulfide, which is the cause of retort odor, and produces zinc sulfide.

The gas barrier layer 4 can be formed through a process of forming a coating film on the inorganic deposited layer 3. The coating film in this case contains zinc ions, at least one of metal alkoxide and its hydrolysate, and an aqueous polymer. The metal alkoxide and/or its hydrolysate, and the aqueous polymer become an organic-inorganic composite by hydrolyzation and dehydration condensation (e.g., sol-gel method). The ionic zinc that has been contained in the coating liquid is fixed inside the gas barrier layer 4 in a state of being adequately uniformly dispersed. Specifically, the metal alkoxide described later and water are permitted to cause a hydrolytic polycondensation reaction so that Si, Ti, Al, Zr or the like forms a metal-oxide (M-O) bond and that the aqueous polymer and the zinc are captured into the main chain skeleton of the metal oxide. Thus, water or moisture resistance can be balanced with gas barrier properties and flexibility. In addition, loss of zinc due to an acidic solution or the like is minimized.

When preparing the coating liquid for forming the gas barrier layer 4, a chloride, hydroxide, carbonate, organic salt or inorganic salt of zinc may be used as a source of zinc ions. Of these materials, a chloride of zinc (zinc chloride) may be preferred from the perspective of solubility in a solvent. According to the research made by the inventors, when zinc chloride is used as a source of zinc ions, chlorine corresponding to an addition amount can be detected from the gas barrier layer 4 by analysis of the composition thereof using an X-ray fluorescence spectrometer.

Examples of the solvent include water, methyl alcohol, ethyl alcohol, isopropyl alcohol, n-propyl alcohol, n-butyl alcohol, n-pentyl alcohol, dimethyl sulfoxide, dimethyl formamide, dimethyl acetamide, toluene, hexane, heptane, cyclohexane, acetone, methyl ethyl ketone, diethyl ether, dioxane, tetrahydrofuran, ethyl acetate, and butyl acetate. These solvents may be used singly or in combination of two or more. Of these solvents, methyl alcohol, ethyl alcohol, isopropyl alcohol, toluene, ethyl acetate, methyl ethyl ketone, and water are preferred from the perspective of coatability. From the perspective of productivity, methyl alcohol, ethyl alcohol, isopropyl alcohol, and water are preferred. To allow zinc ions to remain stably present in the coating liquid, an acid may preferably be added to the coating liquid. As the acid, for example, hydrochloric acid (diluted hydrochloric acid) may be used.

The metal alkoxide is a compound that is expressed by the general formula: M(OR)n (M is a metal such as Si, Ti, Al, Zr or the like, and R is an alkyl group such as $CH_3$, C2H5 or the like); and specific examples may include tetraethoxysilane {$Si(OC_2H_5)_4$}, triisopropoxy aluminum {$Al(O-2'-C_3H_7)_3$}, and the like. Of these materials, tetraethoxysilane and triisopropoxy aluminum are preferred because of being relatively stable in an aqueous solvent after hydrolysis.

As the aqueous polymer, polyvinyl alcohol, polyvinyl pyrrolidone, starch, methyl cellulose, carboxymethyl cellulose, sodium alginate, and the like may be mentioned. Of these materials, polyvinyl alcohol (hereinafter abbreviated as PVA) is preferred because the obtained gas barrier layer 4 will have good gas barrier properties. PVA referred to herein is generally obtained by saponification of polyvinyl acetate. For example, a partially saponified PVA in which several tens of percent of acetic acid groups remains, a complete PVA in which only a few percent of acetic acid groups remains, or the like can be used.

The coating liquid for forming the gas barrier layer 4 may appropriately contain as necessary known additives such as an isocyanate compound, a silane coupling agent, a dispersant, a stabilizer, a viscosity modifier, a coloring agent and the like to an extent not impairing the gas barrier properties.

In the present embodiment, a compound (silane coupling agent (SC)) expressed by a formula $(R_1Si(OR_2)_3)n$ is added to the coating liquid to maintain water resistance under extreme conditions, such as boiling or retorting. The organic functional group ($R_1$) is preferably a nonaqueous functional group, such as vinyl, epoxy, methacryloxy, ureido, isocyanate, or the like. Since the nonaqueous functional group is hydrophobic, water resistance is even more improved.

In the case where the compound expressed by the formula $(R_1Si(OR_2)_3)n$ is a multimer, preferably the compound is a trimer, and more preferably 1,3,5-tris (3-trialkoxysilylalkyl) isocyanurate. This is a condensation of 3-isocyanate alkyl alkoxysilane. It is known that this 1,3,5-tris (3-trialkoxysilylalkyl) isocyanurate has no chemical reactivity in the isocyanate moiety, but that reactivity is ensured by the polarity of the isocyanurate moiety. Generally, similarly to 3-isocyanate alkyl alkoxysilane, 1,3,5-tris (3-trialkoxysilylalkyl) isocyanurate is added to an adhesive or the like, and is known to serve as an adhesion-enhancing agent. Therefore, by adding 1,3,5-tris (3-trialkoxysilylalkyl) isocyanurate to an aqueous polymer having the hydroxyl group, water resistance of the gas barrier layer can be improved by hydrogen bonding. While 3-isocyanate alkyl alkoxysilane has high reactivity and low liquid stability, the isocyanurate moiety of 1,3,5-tris (3-trialkoxysilylalkyl) isocyanurate is easily dispersed in an aqueous solution and stably maintains viscosity, although not water soluble due to the polarity. In addition, the water resistance performance of 3-isocyanate alkyl alkoxysilane is equivalent to that of 1,3,5-tris (3-trialkoxysilylalkyl) isocyanurate.

Some 1,3,5-tris (3-trialkoxysilylalkyl) isocyanurate is produced by thermal condensation of 3-isocyanate propylalkoxysilane and may contain 3-isocyanate propylalkoxysilane from the base material. However this poses no particular problem. More preferably, the compound is 1,3,5-tris (3-trialkoxysilylpropyl) isocyanurate, and even more preferably 1,3,5-tris (3-trimethoxysilylpropyl) isocyanurate. Since this methoxy group has a fast hydrolysis rate, and compounds containing a propyl group can be obtained at a comparatively low price, 1,3,5-tris (3-trimethoxysilylpropyl) isocyanurate is practically advantageous.

In the case where the formula $(R1Si(OR2)3)n$ is converted to $R_2Si(OH)_3$, the solid content of $R_2Si(OH)_3$ is preferably in the range of 1 mass % to 50 mass % relative to the total solid content. When this amount is less than 1 mass %, the water resistance effect tends to become low, and when the amount exceeds 50 mass %, the gas barrier properties tend to decrease because the functional groups become voids in the gas barrier layer. To obtain water resistance and gas barrier properties required for boiling or retorting sterilization, the above solid content relative to the total solid content is more preferably in the range of 5 mass % to 30 mass %.

The gas barrier layer 4 is formed through a process of applying a coating liquid onto the surface of the inorganic deposited layer 3. A known commonly used method may be used for applying a coating liquid. The method may be casting, dipping, roll coating, gravure coating, screen printing, reverse coating, spray coating, kit coating, die coating, metering bar coating, combined chamber and doctor coating, curtain coating or the like. The coating film formed by applying a coating liquid is dry heated to form a gas barrier layer 4.

The thickness of the gas barrier layer 4 may be appropriately determined according to usage, but may preferably be in the range of 0.01 µm to 100 µm, and more preferably 0.01 µm to 50 µm. When the gas barrier layer 4 has a thickness (dry thickness) of 0.01 µm or more, a uniform coating film is more easily formed and adequate gas barrier properties are easily achieved. With the thickness being 100 µm or less, the occurrence of cracks is more easily minimized.

The zinc content of the gas barrier layer 4 is preferably in the range of 1 mass % to 10 mass % relative to the mass of the gas barrier layer 4, more preferably 3 mass % to 7 mass %, and even more preferably 4 mass % to 6 mass %. When the zinc content is 1 mass % or more, retort odor is adequately reduced with ease, and when 10 mass % or less, adhesion of the gas barrier layer 4 can be easily ensured.

A product including sulfur-containing amino acid is packaged using the gas barrier laminate 10, followed by heat sterilization. As a method for this, boiling or retorting may be used. These treatments may be used singly or in combination. Retorting is a treatment, in general, of pressurizing and sterilizing food products or the like to kill microorganisms, such as fungi, yeast, bacteria and the like, for preservation of the products. Usually, pressurization and sterilization are performed for 10 to 120 minutes at 105° C. to 140° C. and 0.15 MPa to 0.30 MPa. Retort devices include steam type devices using heated steam, and hot water type devices using pressurized and superheated water. These types of devices are appropriately used depending on sterilization conditions of the food products or the like contained. Boiling is a treatment performed for moist-heat sterilization of food products or the like, for preservation thereof. Usually, a food product or the like packaged by a gas barrier laminate is subjected to moist-heat sterilization for 10 to 120 minutes at 60° C. to 100° C. and atmospheric pressure, although it depends on the contents. Boiling treatment for sterilization, which is usually performed using a hot water bath, includes a batch type treatment of immersing a food product or the like into a hot water bath of a fixed temperature and removing after a predetermined time, and a continuous type treatment of passing a food product or the like through a hot water bath tunnel.

The gas barrier laminate 10, which is provided with the inorganic deposited layer 3 and the gas barrier layer 4, exerts good gas barrier properties and good effects of reducing retort odor. Under conditions of 30° C. and 70% RH, the gas barrier laminate 10 preferably has an oxygen permeability of 30 cc/m2·day·MPa or less, more preferably 15 cc/m2·day·MPa or less, and even more preferably 1.5 cc/m2·day·MPa or less. The oxygen permeability, which is preferred to be lower, is usually 0.01 cc/m2·day·MPa or more, although the lower limit is not particularly determined. Under conditions of 40° C. and 90% RH, the gas barrier laminate 10 preferably has a vapor permeability of 5 g/m2·day or less, and more preferably 1 g/m2·day or less. The vapor permeability, which is preferred to be lower, is usually 0.01 g/m2·day or more, although the lower limit is not particularly determined.

Figure 2:
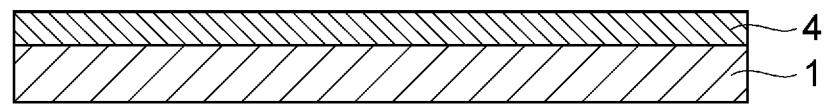
FIG. 2 is a cross-sectional view schematically illustrating another embodiment of a gas barrier laminate, according to the present disclosure.

An embodiment of the present disclosure has been described so far, but the present invention should not be limited to the embodiment described above. For example, if the gas barrier laminate is applied to a usage that does not need such high gas barrier properties, the gas barrier laminate may be in a mode, as shown in FIG. 2, where a gas barrier layer 4 is directly formed on a surface of a base film 1.

EXAMPLES

<Preparation of Coating Liquid for Forming an Adhesive Layer>

Acrylic polyol and triyl-diisocyanate were mixed so that the amount of NCO groups was equal to that of OH groups of the acrylic polyol, and then diluted with ethyl acetate so that the total solid content would be 5 mass %. To this mixture, β-(3,4 epoxycyclohexyl)trimethoxysilane was added and mixed so as to be 5 mass % relative to the total solid content, thereby obtaining a coating liquid for forming an adhesive layer.

Example 1

The coating liquid for forming an adhesive layer set forth above was applied to a corona-treated surface of a biaxially stretched polyethylene terephthalate (PET) film (Lumirror (trademark) P60, 12-μm thickness, manufactured by Toray Industries, Inc.) as a base film by using a gravure coater and dried so as to have a dry thickness of 0.1 μm, thereby forming an adhesive layer. Then, using a vacuum deposition device based on an electron beam heating scheme, silicon was evaporated, while introducing oxygen gas thereto, to deposit silicon oxide on the adhesive layer, thereby forming an inorganic deposited layer with a thickness of 20 nm. Then, a coating liquid for forming a gas barrier layer set forth below was applied onto the inorganic deposited layer by using a gravure coater and dried so as to have a dry thickness of 0.35 μm, thereby forming a gas barrier layer. Thus, a gas barrier laminate was obtained. The gas barrier layer had a zinc content of 6 mass % relative to the mass of the gas barrier layer.

<Preparation of Coating Liquid for Forming a Gas Barrier Layer>

(A) Hydrolyzed solution with a solid content of 5 mass % (in terms of $SiO_2$) obtained by 30-minute stirring and hydrolyzation of 4.8 parts by mass of zinc chloride, 169.2 parts by mass of tetraethoxysilane (TEOS), 51.0 parts by mass of methanol and 40.8 parts by mass of hydrochloric acid (0.1 N)

(B) Water/methanol solution containing 5 mass % of polyvinyl alcohol (PVA) {water:methanol=95:5 (mass ratio)}

These solutions were mixed at a ratio of A:B=54:46 (mass ratio) to thereby prepare a coating liquid for forming a gas barrier layer.

Example 2

A gas barrier laminate was obtained in a manner similar to that of Example 1 except that, when preparing a coating liquid for forming a gas barrier layer, the amount of zinc chloride was changed so that the finally formed gas barrier layer would have a zinc content of 1 mass % relative to the mass of the gas barrier layer.

Example 3

A gas barrier laminate was obtained in a manner similar to that of Example 1 except that, when preparing a coating liquid for forming a gas barrier layer, the amount of zinc chloride was changed so that the finally formed gas barrier layer would have a zinc content of 2 mass % relative to the mass of the gas barrier layer.

Example 4

A gas barrier laminate was obtained in a manner similar to that of Example 1 except that, when preparing a coating liquid for forming a gas barrier layer, the amount of zinc chloride was changed so that the finally formed gas barrier layer would have a zinc content of 3 mass % relative to the mass of the gas barrier layer.

Example 5

A gas barrier laminate was obtained in a manner similar to that of Example 4 except for changing the amount of application of the coating liquid for forming a gas barrier layer so that the gas barrier layer would have a thickness of 0.7 μm instead of 0.35 μm.

Comparative Example 1

A gas barrier laminate was obtained in a manner similar to that of Example 1 except that zinc chloride was not used when preparing a coating liquid for forming a gas barrier layer.

Example 6

A gas barrier laminate was obtained in a manner similar to that of Example 2 except that an inorganic deposited layer of aluminum oxide (20-nm thickness) was formed on an adhesive layer, instead of forming an inorganic deposited layer of silicon oxide. Specifically, to form an inorganic deposited layer of aluminum oxide, a vacuum deposition device using an electron beam heating method was used to evaporate aluminum, while introducing oxygen gas thereto, so that aluminum oxide was deposited on the adhesion layer.

Example 7

A gas barrier laminate was obtained in a manner similar to that of Example 6 except that, when preparing a coating liquid for forming a gas barrier layer, the amount of zinc chloride was changed so that the finally formed gas barrier layer would have a zinc content of 2 mass % relative to the mass of the gas barrier layer.

Example 8

A gas barrier laminate was obtained in a manner similar to that of Example 6 except that, when preparing a coating liquid for forming a gas barrier layer, the amount of zinc chloride was changed so that the finally formed gas barrier layer would have a zinc content of 3 mass % relative to the mass of the gas barrier layer.

Example 9

A gas barrier laminate was obtained in a manner similar to that of Example 8 except for changing the amount of application of the coating liquid for forming a gas barrier layer so that the gas barrier layer would have a thickness of 0.7 μm instead of 0.35 μm.

Comparative Example 2

A gas barrier laminate was obtained in a manner similar to that of Example 6 except that zinc chloride was not used when preparing a coating liquid for forming a gas barrier layer.

Example 10

A gas barrier laminate was obtained in a manner similar to that of Example 6 except that a coating liquid formulated as follows was used as a coating liquid for forming a gas barrier layer. The gas barrier layer had a zinc content of 6 mass % relative to the mass of the gas barrier layer.

<Preparation of Coating Liquid for Forming a Gas Barrier Layer>

(A) Hydrolyzed solution with a solid content of 5 mass % (in terms of $SiO_2$) obtained by 30-minute stirring and hydrolyzation of 4.8 parts by mass of zinc chloride, 163.6 parts by mass of tetraethoxysilane (TEOS), 66.8 parts by mass of methanol and 53.4 parts by mass of hydrochloric acid (0.1 N)

(B) Water/methanol solution containing 5 wt % of polyvinyl alcohol {water:methanol=95:5 (mass ratio)}

(C) Aqueous solution obtained by diluting 1,3,5-tris (3-trimethoxysilylpropyl) isocyanurate with water/isopropyl alcohol solution=1/1 so as to have a solid content of 5% (in terms of mass ratio $R_1Si(OH_3)$) (silane coupling agent (SC))

These solutions were mixed at a ratio of A:B:C=55:45:15 (mass ratio) to thereby prepare a coating liquid for forming a gas barrier layer.

<Evaluation and Methods Thereof>

The gas barrier laminates obtained in Examples 1 to 10 and Comparative Examples 1 and 2 were each measured and evaluated in terms of oxygen gas barrier properties (before and after retorting) and retort odor (alternative evaluation based on hydrogen sulfide concentration) using the following methods. The results are shown in Tables 1 and 2.

(1) Gas Barrier Properties

An unstretched polypropylene film (CPP, Torayfan NO ZK207, 70-μm thickness, manufactured by Toray Advanced Film Co., Ltd.) was dry laminated on the gas barrier layer of each of the gas barrier laminates obtained in Examples 1 to 10 and Comparative Examples 1 and 2 using a two-component adhesive (A525/A52 manufactured by Mitsui Chemicals, Inc.) to obtain a laminate film for forming a package.

Then, the obtained laminate films were each cut to a 20 cm×20 cm size and a plurality of measurement samples were prepared. Some samples of each laminate were subjected to retorting and heating at 121° C. and 0.18 kg/cm2 for 30 minutes to prepare samples for measuring oxygen permeability. The samples were evaluated as follows.

[Method of Measuring Oxygen Permeability]

Oxygen permeability (before and after retorting) was measured using an oxygen permeability measuring device (OXTRAN2/20 manufactured by Modern Control, Inc.) at 30° C. and 70% RH. The measuring method was based on JIS K-7126 method B (equal pressure method). The measured values were indicated with a unit [cc/m2·day·MPa].

(2) Retort Odor (Hydrogen Sulfide Concentration was Measured as Alternative Evaluation.)

[Measurement of Hydrogen Sulfide when L-Cysteine Solution was Heated]

An unstretched polypropylene film (CPP, Torayfan NO ZK207, 70-μm thickness, manufactured by Toray Advanced Film Co., Ltd.) was dry laminated on the gas barrier layer of each of the gas barrier laminates obtained in Examples 1 to 10 and Comparative Examples 1 and 2 using a two-part curable urethane adhesive (A525/A52 manufactured by Mitsui Chemicals, Inc.) to obtain a laminate film for forming a package.

Then, the laminate films were each cut to a 20 cm×20 cm size to form packages by heat sealing. The packages were each filled with 30 ml of L-cysteine solution at a concentration of 0.03%/L (L-cysteine manufactured by Kanto Chemical Co., Inc. was used) and then hermetically heat sealed so that the internal dimension would be 80 mm×80 mm. After that, the packages were retorted and heated for 30 minutes at 121° C. and 0.18 kg/cm2.

Then, each package was opened and hydrogen sulfide concentration of the L-cysteine solution was quantified using a methylene blue method and measured using a calibration curve method and using an absorptiometer (cf. "Quantification of hydrogen sulfide in hot spring waters using methylene blue absorption photometry" by Miho YANO, Hyogo Prefectural Institute of Public Health and Environmental Sciences). Tables 1 and 2 show the results of measuring absorbance using an absorptiometer.

TABLE 1

|  | Example 1 | Example 2 | Example 3 | Example 4 | Example 5 | Comparative Example 1 |
|---|---|---|---|---|---|---|
| Inorganic deposited layer | SiOx | SiOx | SiOx | SiOx | SiOx | SiOx |
| Zn (mass %) | 6 | 1 | 2 | 3 | 3 | 0 |
| TEOS (mass %) | 61.0 | 64.5 | 63.7 | 63.0 | 63.0 | 65.0 |
| PVA (mass %) | 33.0 | 34.5 | 34.3 | 34.0 | 34.0 | 35.0 |
| Thickness of gas barrier layer (μm) | 0.35 | 0.35 | 0.35 | 0.35 | 0.7 | 0.35 |
| Oxygen permeability (cc/m2 · day · MPa) Before retorting | 0.18 | 0.20 | 0.15 | 0.17 | 0.19 | 0.21 |
| Oxygen permeability (cc/m2 · day · MPa) After retorting | 0.67 | 1.23 | 1.49 | 1.03 | 0.82 | 1.24 |
| Absorbance @668 nm | 0.209 | 0.375 | 0.367 | 0.294 | 0.197 | 0.496 |

TABLE 2

|  | Example 6 | Example 7 | Example 8 | Example 9 | Comparative Example 2 | Example 10 |
|---|---|---|---|---|---|---|
| Inorganic deposited layer | AlOx | AlOx | AlOx | AlOx | AlOx | AlOx |
| Zn (mass %) | 1 | 2 | 3 | 3 | 0 | 6 |

TABLE 2-continued

|  | Example 6 | Example 7 | Example 8 | Example 9 | Example 2 | Comparative Example 10 |
|---|---|---|---|---|---|---|
| TEOS (mass %) | 64.5 | 63.7 | 63.0 | 63.0 | 65.0 | 59 |
| PVA (mass %) | 34.5 | 34.3 | 34.0 | 34.0 | 35.0 | 28 |
| SC (mass %) | — | — | — | — | — | 7 |
| Thickness of gas barrier layer (μm) | 0.35 | 0.35 | 0.35 | 0.7 | 0.35 | 0.35 |
| Oxygen permeability (cc/m2 · day · MPa) Before retorting | 0.14 | 0.18 | 0.19 | 0.14 | 0.15 | 0.16 |
| Oxygen permeability (cc/m2 · day · MPa) After retorting | 0.58 | 0.58 | 0.46 | 0.68 | 0.82 | 0.38 |
| Absorbance @668 nm | 0.427 | 0.347 | 0.301 | 0.205 | 0.478 | 0.179 |

(3) Evaluation of Acid Resistance

An unstretched polypropylene film (CPP, Torayfan NO ZK207, 70-μm thickness, manufactured by Toray Advanced Film Co., Ltd.) was dry laminated on the gas barrier layer of the gas barrier laminate obtained in Example 1 using a two-component adhesive (A525/A52 manufactured by Mitsui Chemicals, Inc.) to obtain a laminate film for forming a package.

Then, the above laminate film was cut to a 20 cm×20 cm size to form a package by heat sealing. The package was filled with 30 ml of acetic acid at a concentration of 4%/L and then hermetically heat sealed as above so that the internal dimension would be 80 mm×80 mm. Another hermetically sealed package was obtained in a similar manner, except that water was filled in the package instead of acetic acid.

The hermetically sealed packages filled with acetic acid and water were left standing under conditions of 40° C. and 90% RH for 3 months and then opened to measure lamination strength of the gas barrier laminates (peeling mode: immersion in water at) 180°. As a result, the gas barrier laminate holding acetic acid had a laminate strength of 2.8 N/15 mm, while the gas barrier laminate holding water had a laminate strength of 3.0 N/15 mm. These values were approximate to each other.

INDUSTRIAL APPLICABILITY

The present disclosure provides a gas barrier laminate which is capable of adequately highly reducing retort odor and adequately minimizing separation of a layer even when in contact with food or the like containing acids, and a method of producing the gas barrier laminate.

REFERENCE SIGNS LIST

1 . . . Base film; 2 . . . Adhesive layer; 3 . . . Inorganic deposited layer; 4 . . . Gas barrier layer; 10 . . . Gas barrier laminate.

What is claimed is:

1. A method of forming a gas barrier laminate, comprising depositing on a structure comprising a base film a coating liquid comprising (a) at least one of metal alkoxide and a hydrolysate thereof, (b) zinc ions; (c) an aqueous polymer, (d) an acid and (e) a solvent, wherein the base film is a polyester film or a polyamide film, the base film having a thickness of 6 microns to 200 microns; and,
drying the coating liquid to form a gas barrier film on the structure, wherein a content of the zinc ions in the gas barrier film is from 1 mass % to 7 mass %, wherein the formed gas barrier laminate comprises the structure and the gas barrier film.

2. The method of claim 1, wherein the structure consists of the base film.

3. The method of claim 1, wherein the structure is a first laminate comprising the base film, an adhesive layer on the base film and an inorganic oxide film on the adhesive layer and wherein the coating liquid is deposited on the inorganic oxide film.

4. The method of claim 3, wherein the formed gas barrier laminate consists of the base film, the adhesive layer, the inorganic oxide film and the gas barrier film.

5. The method of claim 3, wherein the inorganic oxide layer consists of aluminum oxide or silicon oxide.

6. The method of claim 3, wherein the content of the zinc ions in the gas barrier film is from 3 mass % to 6 mass %.

7. The method of claim 3, wherein a thickness of the gas barrier film is from 0.35 microns to 0.7 microns.

8. The method of claim 3, wherein the coating liquid contains zinc chloride.

9. The method of claim 3, wherein the aqueous polymer is polyvinyl alcohol.

10. The method of claim 4, wherein the inorganic oxide layer consists of aluminum oxide or silicon oxide, the content of the zinc ions in the gas barrier film is from 3 mass % to 6 mass %, a thickness of the gas barrier film is from 0.35 microns to 0.7 microns, the coating liquid contains zinc chloride and the aqueous polymer is polyvinyl alcohol.

11. A gas barrier laminate, comprising
a structure comprising a base film, wherein the base film is a polyester film or a polyamide film, the base film having a thickness of 6 microns to 200 microns; and
a gas barrier film on the structure, wherein the gas barrier film formed by drying a coating liquid comprising (a) at least one of metal alkoxide and a hydrolysate thereof, (b) zinc ions; (c) an aqueous polymer, (d) an acid and (e) a solvent and wherein a content of the zinc ions in the gas barrier film is from 1 mass % to 7 mass %.

12. The gas barrier laminate of claim 11, wherein the structure consists of the base film.

13. The gas barrier laminate of claim 11, wherein the structure is a first laminate comprising the base film, an adhesive layer on the base film and an inorganic oxide film on the adhesive layer and wherein the gas barrier film is on the inorganic oxide film.

14. The gas barrier laminate of claim 13, which consists of the base film, the adhesive layer, the inorganic oxide film and the gas barrier film.

15. The gas barrier laminate of claim 13, wherein the inorganic oxide layer consists of aluminum oxide or silicon oxide.

16. The gas barrier laminate of claim 13, wherein the content of the zinc ions in the gas barrier film is from 3 mass % to 6 mass %.

17. The gas barrier laminate of claim 13, wherein a thickness of the gas barrier film is from 0.35 microns to 0.7 microns.

18. The gas barrier laminate of claim 13, wherein the coating liquid contains zinc chloride.

19. The gas barrier laminate of claim 13, wherein the aqueous polymer is polyvinyl alcohol.

20. The gas barrier laminate of claim 14, wherein the inorganic oxide layer consists of aluminum oxide or silicon oxide, the content of the zinc ions in the gas barrier film is from 3 mass % to 6 mass %, a thickness of the gas barrier film is from 0.35 microns to 0.7 microns, the coating liquid contains zinc chloride and the aqueous polymer is polyvinyl alcohol.

\* \* \* \* \*